United States Patent [19]

Martin

[11] 4,245,455
[45] Jan. 20, 1981

[54] LAWN MOWER

[75] Inventor: Kenneth G. Martin, Middridge, England

[73] Assignee: Flymo Societe Anonyme, Zug, Switzerland

[21] Appl. No.: 19,904

[22] Filed: Mar. 12, 1979

[30] Foreign Application Priority Data

Mar. 13, 1978 [GB] United Kingdom ............... 9792/78

[51] Int. Cl.³ .............................................. A01D 53/00
[52] U.S. Cl. ..................................... 56/12.8; 56/17.5; 56/DIG. 3
[58] Field of Search ................... 56/320.1, 320.2, 12.8, 56/DIG. 3, 17.5

[56] References Cited

U.S. PATENT DOCUMENTS

| 3,601,960 | 8/1971 | Buechler | 56/320.2 |
| 3,750,378 | 8/1973 | Thorud et al. | 56/320.2 |
| 3,759,023 | 9/1973 | Comer | 56/320.1 |
| 3,838,558 | 10/1974 | Goodchild | 56/DIG. 3 |
| 3,925,972 | 12/1975 | Andersson et al. | 56/320.2 |

FOREIGN PATENT DOCUMENTS

| 1482002 | 5/1969 | Fed. Rep. of Germany | 56/12.8 |
| 1297385 | 6/1969 | Fed. Rep. of Germany | 56/DIG. 3 |
| 1944645 | 5/1971 | Fed. Rep. of Germany | 56/17.5 |
| 2627167 | 12/1977 | Fed. Rep. of Germany | 56/17.5 |
| 106617 | 5/1965 | Norway | 56/320.2 |
| 992120 | 5/1965 | United Kingdom | 56/12.8 |

Primary Examiner—Paul J. Hirsch
Attorney, Agent, or Firm—Alfred E. Miller

[57] ABSTRACT

An air cushion lawn mower has a rotary grass cutting blade and a fan driven by a motor. A hood encloses the cutting blade and the fan and includes a generally vertical wall portion which is part cylindrical and which extends over an arc of 270° about the axis of rotation of the blade and close to the path of rotation of the tips of the blade. The hood has an outwardly directed peripheral lip spaced outwardly of, and in a generally horizontal direction from, the lower extremity of the vertical wall portion. An outlet for cut grass is located in a position in relation to the vertical wall portion such that the cut grass is ejected through the outlet into a grass collecting container. The lowest surface of the peripheral lip is preferably in a horizontal plane which is below the lower extremity of the vertical wall portion.

13 Claims, 2 Drawing Figures

LAWN MOWER

FIELD OF THE INVENTION

This invention relates to a lawn mower of the type which in operation is supported on a cushion of air and which comprises a motor-driven blade rotatable about a vertical axis and a fan rotatable about the same axis, the blade and fan being enclosed by a hood which has one or more than one inlet for air forming the cushion of air and an outlet opening for grass cut by the blade.

DESCRIPTION OF THE PRIOR ART

A mower of the type described above is known, see for example British Pat. No. 929,610. Such a mower is driven by an electric motor or an internal combustion engine. But it has not been found possible when using this type of mower satisfactorily to collect grass cut during operation, although such a mower is described in the patent literature, see for example British Pat. No. 997,528. The reason for this is believed to be that it is difficult to transfer the cut grass to a collecting container without substantial reduction of the supporting capability of the air cushion. The air stream which is used to transfer the grass to the collecting container, has to be taken from the air stream produced by the fan and which is normally wholly used in forming the air cushion. It would have been thought that this could be done easily by using a motor of greater power, but such a motor is heavier and the added power will instead be used to lift the greater weight. The result would be generally the same as when using a smaller motor. Thus it has proved to be necessary to reduce air flow losses by giving the hood a proper shape with respect to such losses and to transfer cut grass to the container with the least possible energy consumption while at the same time designing the hood so as to obtain the necessary supporting capability.

SUMMARY OF THE INVENTION

In a lawn mower of the type which in operation is supported on a cushion of air, the mower comprises:

a hood having at least one inlet for air forming the cushion of air and an outlet opening for cut grass;

a motor mounted by the hood;

an elongate grass-cutting blade within the hood and rotatable by the motor about a vertical axis, the blade having a blade tip at each of its ends, which tips in operation of the blade describe a circular path; and a fan within the hood and rotatable about the said vertical axis to provide the cushion of air;

the invention provides the improvement wherein the hood includes a generally vertical wall portion which (i) substantially surrounds the grass-cutting blade; (ii) is curved in a horizontal plane; (iii) extends adjacent the said circular path over an arc of at least about 180°; (iv) is disposed in a position in relation to the said outlet opening such that in operation grass cut by the said blade is ejected through the said outlet opening; and (v) has a lower extremity; and the improvement wherein the hood includes an outwardly directed peripheral lip spaced outwardly and in a generally horizontal direction from the said lower extremity.

Figure 2:
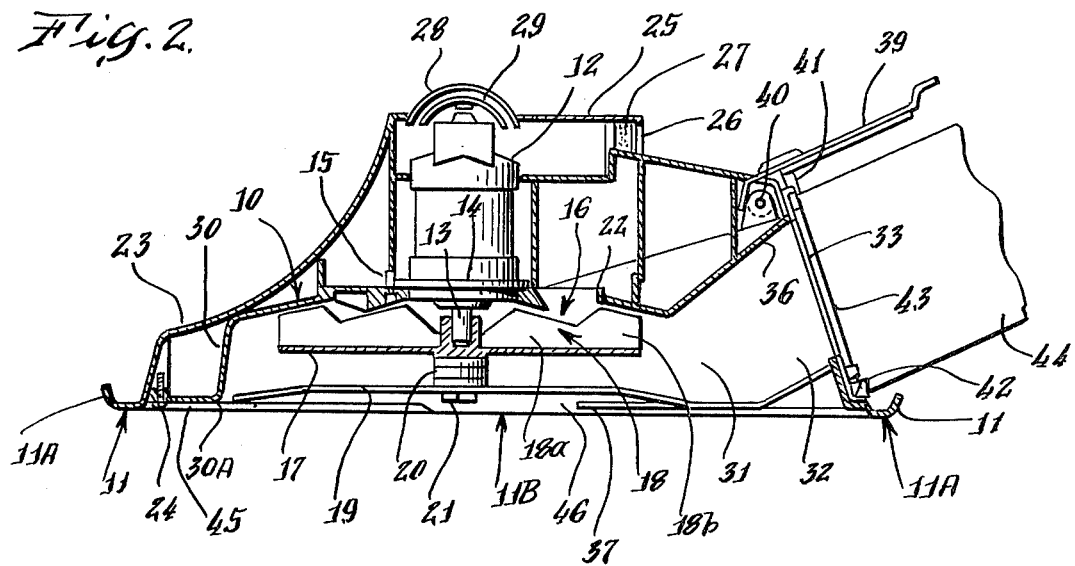
FIG. 2 is a vertical longitudinal section on the line II—II of FIG. 1.

Referring to the drawing, there is shown one embodiment of a lawn mower of the type which in operation is supported on a cushion of air and which comprises a blade 19 rotatable about a vertical axis 13A on a shaft 13 by an electric motor 12, which also rotates a fan 16 about the same axis 13A. The blade 19 and fan 16 are enclosed by a hood 10 of plastics material which has inlet openings 22 through which air is drawn by the fan 16 for forming the cushion of air which supports the mower when it is in operation. The hood 10 has an outlet opening 31 through which is blown grass cut by the blade 19.

Instead of the electric motor 12 it would be possible to use an internal combustion engine. The motor 12 is secured to the hood 10 by a flange 14 and fastening means 15.

Figure 1:
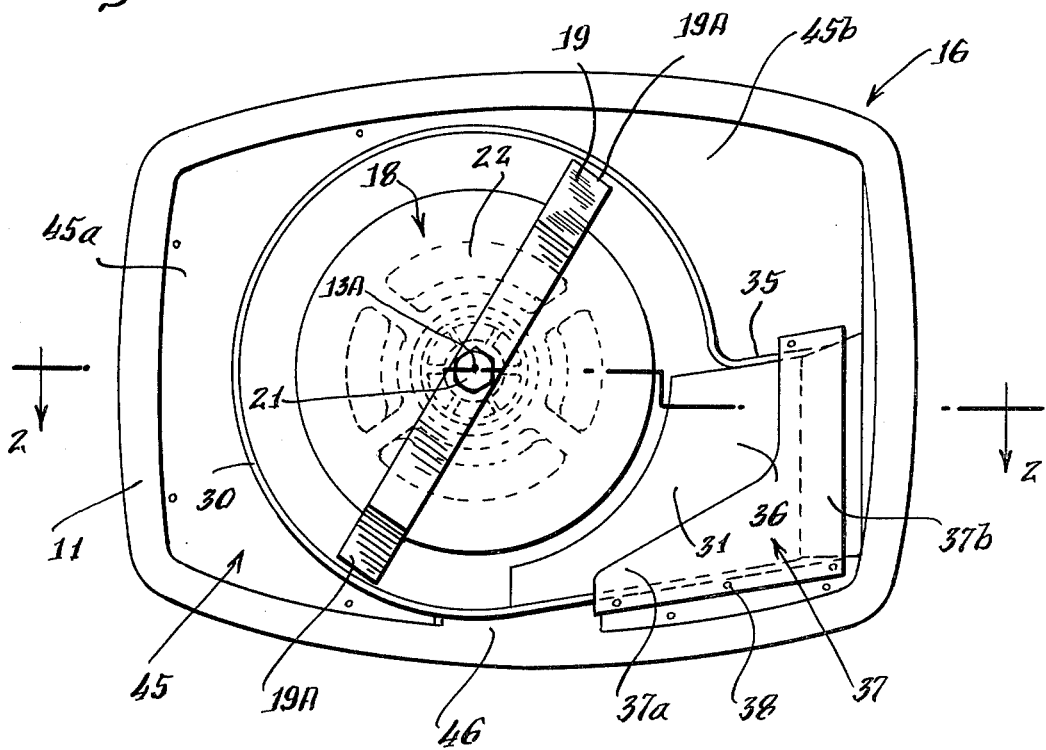
FIG. 1 is an underneath plan view of the mower.

The hood includes a generally vertical wall portion 30 which, as may be seen particularly from FIG. 1, substantially surrounds the blade 19, that is, it extends around the blade over an arc of about 270°, although in other embodiments this arc could be less than 270° but not less than 180°. The wall portion 30 is curved in a horizontal plane and in this embodiment is part of a cylinder, which is slightly frusto-conical in that it tapers upwardly and slightly inwardly, see FIG. 2. The curved wall portion 30 extends adjacent the circular path of the tips 19A of the blade 19, and the spacing between each tip 19A and the wall portion 30 is preferably 5 mm but may be as great as 10 mm. The position of the curved generally vertical wall portion 30 in relation to the outlet opening 31 is (see FIG. 1) such that grass cut by the blade is carried by some of the air within the wall portion 30 and is ejected through the opening 31.

The hood 10 has an outwardly directed peripheral lip 11 which extends around the whole lower periphery of the hood. The lip 11 is spaced outwardly and in a generally horizontal direction (FIG. 2) from the lower extremity 30A of the curved wall portion 30. In the present embodiment it will be seen that the lowest surface 11A of the lip 11 lies in a horizontal plane 11B and that this horizontal plane 11B is at a level which is below the lower extremity 30A of the wall portion 30.

The lower part of the shaft 13 supports the fan 16, comprising a disc 17 with upwardly extending arcuate blades 18, and the grass cutting blade 19. Each fan blade 18 has an inner central portion 18a and an outer portion 18b, thus making the fan a two-stage fan. The blade 19 is a flat iron bar and is fixed to the fan 16 by spacers 20 and a bolt 21. The blade 19 rotates at the same speed as the fan and the motor shaft. The outer portion 18b of each fan blade has an upper edge close to the upper part of the hood so that the air being transferred to the air cushion is forced to pass the peripheral portions 18b. The motor 12 has a cover 23 fastened to the hood 10 by screws 24. The upper part 25 of the cover 23 forms a passage through which cooling air is drawn to the motor through openings 26. In the upper part 25 is a filter 27, which can readily be removed for cleaning. Cooling air sucked through the opening 26 flows through the upper part 25 and continues downwards below the rotor and stator windings (not shown) of the electric motor by way of the central portion 18a before being transferred to the peripheral portions 18b of the fan blades and finally to the air cushion.

The upper part 25 of the cover 23 has a hemispherical sight-glass 28 over an indicator plate 29 on the upper end of the shaft 13. By observing rotation of the plate 29 the operator can see when the blade 19 stops so as to avoid touching the rotating blade.

In this embodiment the central wall portion 30 of the hood is shaped as a part of a cylinder co-axial with the axis 13A. The central wall portion 30 has the outlet opening 31 extending around 90° of the periphery of the cylinder. The opening 31 communicates via a channel 32 with an outlet opening 33 in a rear part of the hood. The channel 32 has an outer side wall 34 and an inner side wall 35, an upper wall 36 and a bottom plate 37. The upper wall 36 and the side walls 34, 35 are integral with the hood. The bottom plate 37 is separate and is fixed to the hood by screws 38. The outer side wall 35 is inclined (FIG. 1) relative to a vertical plane in the length of the hood. The inclination is preferably greater than 5°. The inner side wall 35 has a corresponding inclination. As can also be seen in FIG. 1 the side wall 35 is a continuation of the curved wall portion 30 in a tangential manner.

The bottom plate is generally L-shaped. One leg 37a of the bottom plate is triangular in shape and is disposed so that its apex tip extends forwards. The other leg 37b is perpendicular to the length of the hood. The apex of the bottom plate 37 is adjacent the circular tip path of the blade tips 19A. The distance between this path and the bottom plate 37 increases (FIG. 1) as seen in the direction of rotation of the blade 19. This arrangement assists in preventing cut grass from clogging the channel 32, in that the cut grass can fall to the ground, if such clogging tends to occur. As can be seen from FIG. 2, the rear leg 37b of the plate 37 and also the upper channel wall 36 are directed rearwardly upwardly. This inclination is preferably at least 20° to the horizontal so that the cut grass will pass properly into a flexible grass container bag 44, which is fastened to the outlet 33 of the channel 32. Thus the grass is packed from the rear part of the bag and then forwards.

The outlet 33 has a lid 39, whose upper edge is mounted by a hinge 40. The lid has a shoulder 41 by which the bag 44 is fastened to the hood 10. The hood also has fasteners 42 below the outlet opening. These fasteners serve as a holding means for the grass bag and keep the lid closed when the bag is not in use.

The bag 44 has a front part in the form of a rectangular frame 43 of rigid material. The frame 43 is fastened around the opening of the flexible bag 44, whose rear end (not shown) is supported by the handle (not shown) of the mower by straps, also not shown. Thus the weight of cut grass collected in the bag 44 is supported by the operator rather than by the mower. The bag 44 has holes through which the air stream which carries the cut grass from within the hood to the grass bag is disposed. The amount of air dispersed through the holes in the bag 44 must be controlled so as not to divert too much air from the air cushion such as would prevent the machine hovering, but nevertheless sufficient to carry the cut grass into the bag. Thus the amount of air flowing from the hood through the channel 32 into the bag 44 is controlled by the sizes and shapes of the holes in the bag 44.

The frame 43 can be fastened to the hood 10 by the fasteners 42 and the shoulder 41 of the lid 39 so as to cover the entire outlet 33.

There is no need in this embodiment to use a twisted blade as is usual in mowers supported by wheels, since the cut grass is transported by the air flow from the hood to the bag 44.

As shown, the hood 10 has a flat portion 45 between the curved wall portion 30 and the lip 11. The flat portion 45 is disposed slightly above lip plane 11B, preferably 2 to 10 mm, and extends over an arc of about 270°. The flat portion 45 comprises primarily a relatively large surface portion 45a at the front of the hood and a smaller surface portion 45b at the rear of the hood beside the channel 32. The surface 45b merges into the bottom channel plate 37. The flat surface portion 45 causes the formation of a stable air cushion below the hood so that sufficient lifting force is obtained.

To prevent cut grass being ejected from the hood before entering the channel 32, the central portion 46 at one side of the hood 10 is widened inwardly, as seen in FIG. 1. Thus this portion 46 widens the lip 11 at this part. The portion 46 extends generally from the tip of the bottom plate 37 to a point slightly ahead of the axis 13A.

The invention is not limited to the embodiment described above but can be modified within the scope of the claims.

What is claimed is:

1. A lawn mower of the type which when operative is supported on a cushion of air comprising a motor driven blade rotatable about a vertical axis, a fan rotatable about said vertical axis, and a hood enclosing said blade and fan having at least one inlet for air forming the cushion of air, and an outlet opening for grass cut by said blade, said hood having a generally vertical wall portion which substantially surrounds said blade and is curved in a horizontal plane and extends adjacent to the circular path of the blade tips over an arc of at least 180°, said vertical wall portion being arranged relative to the outlet opening whereby the cut grass is ejected through said outlet opening, said hood having an outwardly directed peripheral lip extending in a generally horizontal direction from the lower extremity of said vertical wall portion, the lowest part of said peripheral lip lying in a horizontal plane which is in a plane below said lower extremity, said hood having a substantially plane horizontal surface between said lowest part of the peripheral lip and said lower extremity of said vertical wall portion, said surface being spaced in a plane above said horizontal plane.

2. A lawn mower as claimed in claim 1 wherein cut grass is ejected through said outlet opening by said blade and by air caused by the rotation of said fan.

3. A lawn mower as claimed in claim 1 wherein said generally vertical wall portion is part of a cylinder and extends over an arc of 270°, said wall portion being coaxial with the axis of said rotation of said blade.

4. A lawn mower as defined in claim 1, wherein the said outlet opening leads into a rearwardly and upwardly directed channel which is of rectangular cross-section and has upper, lower and inner and outer side walls, the said outer side wall being a tangential continuation of the said curved wall portion and lying in a vertical plane inclined at not less than about 5° to a longitudinal vertical plane passing through the said vertical axis, and the said inner wall of the channel being parallel to the said outer wall of the channel.

5. A lawn mower as defined in claim 4, wherein the said lower wall of the channel is a bottom plate having a leading part near the said circular path, the spacing between the said leading part and the circular path increasing in the direction of blade rotation, and the said bottom being essentially of an L-shape, the said leading part constituting one leg of the L and being directed forwardly.

6. A lawn mower as defined in claim 5, wherein the said leading part of the bottom plate is horizontal, the bottom plate having a rear part which extends rearwardly and upwardly at an angle of not less than about 20° to a horizontal plane.

7. A lawn mower as defined in claim 1, wherein the said outlet opening is connected to a grass-collecting container which is provided with holes of such size and/or shape as to permit a sufficient flow of air carrying cut grass from the said hood to the container without preventing formation of the said cushion of air.

8. A lawn mower as defined in claim 1, wherein:
(i) the said peripheral lip has an inwardly extending portion disposed in a position laterally of the said vertical axis, the said position being approximately when the said blade tips move respectively rearwardly with reference to the forward direction of movement of the mower;
(ii) the said inwardly extending portion has a lower surface which is a continuation of the said lower surface of the peripheral lip; and
(iii) the said inwardly extending portion extends inwardly at least along part of its length as far as the said curved wall portion of the hood.

9. A lawn mower according to claim 8 wherein the inwardly extending portion has its lowest surface in the plane of the lowest surface of the peripheral lip, the portion at least along a part of its length extending inwardly to the curved wall portion.

10. A lawn mower according to claim 9 wherein the length of the inwardly extending portion is not less than 20% of the hood.

11. A lawn mower as defined in claim 10 wherein:
(i) the said horizontal surface is continuous and extends over an angle of about 270° around the said vertical axis;
(ii) the said horizontal surface is disposed at a level from 2 to 10 mm. higher than the said horizontal plane in which the lower surface of the peripheral lip lies; and (iii) the said horizontal surface is longer in the length direction than in the transverse direction of the mower.

12. A lawn mower as defined in claim 7 which is provided with a handle operatively connected to the said hood and extending rearwardly and upwardly from the hood, the said handle having means to support the said grass collecting container.

13. A lawn mower according to claim 10 wherein the outlet opening extends over an angle of about 90° relative to the axis of rotation.

* * * * *